May 9, 1944.    R. H. HANLON    2,348,621
METHOD OF OPERATING ENGINES
Filed March 27, 1943    5 Sheets-Sheet 1

Inventor
Robert H. Hanlon
By
Attorney

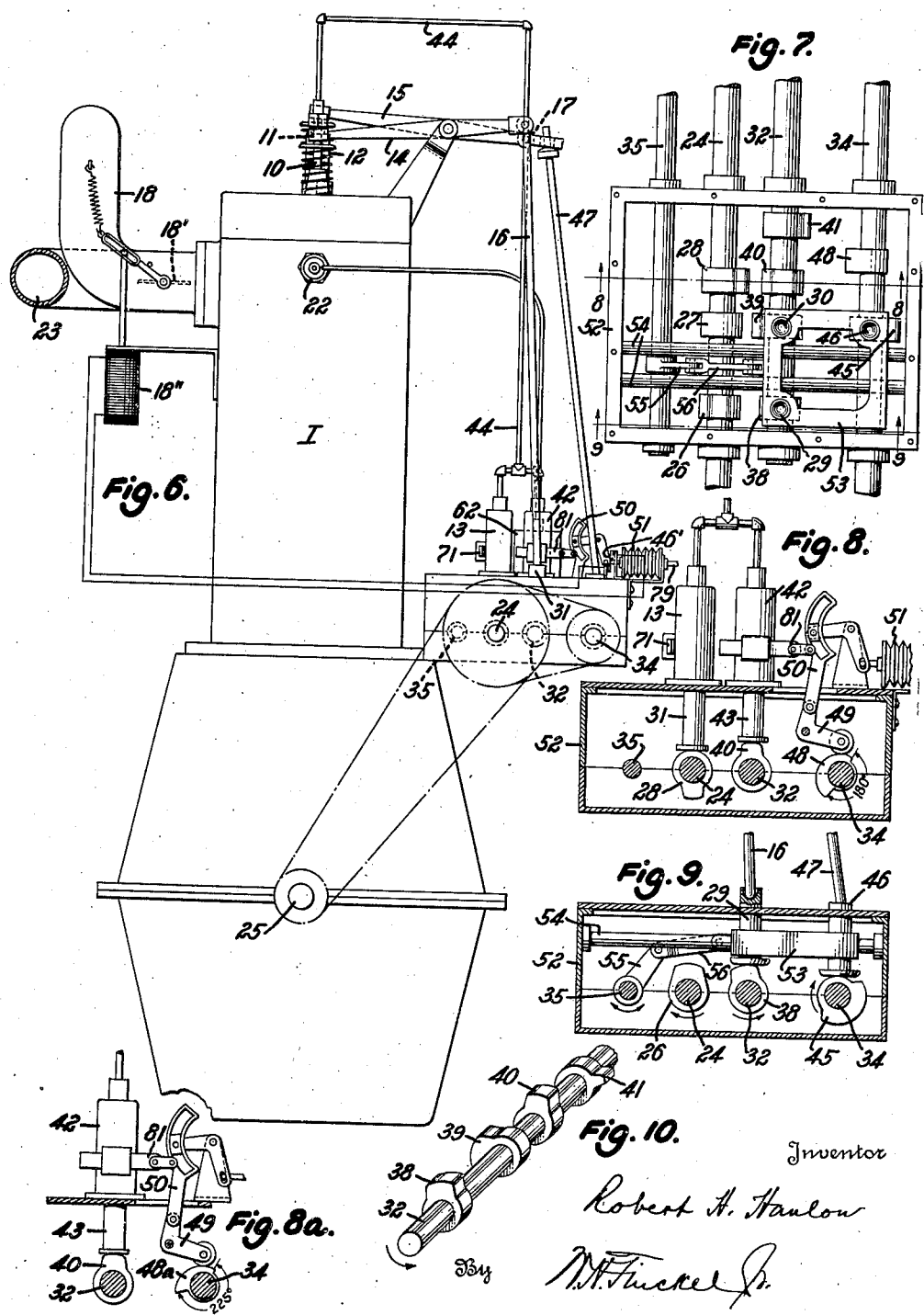

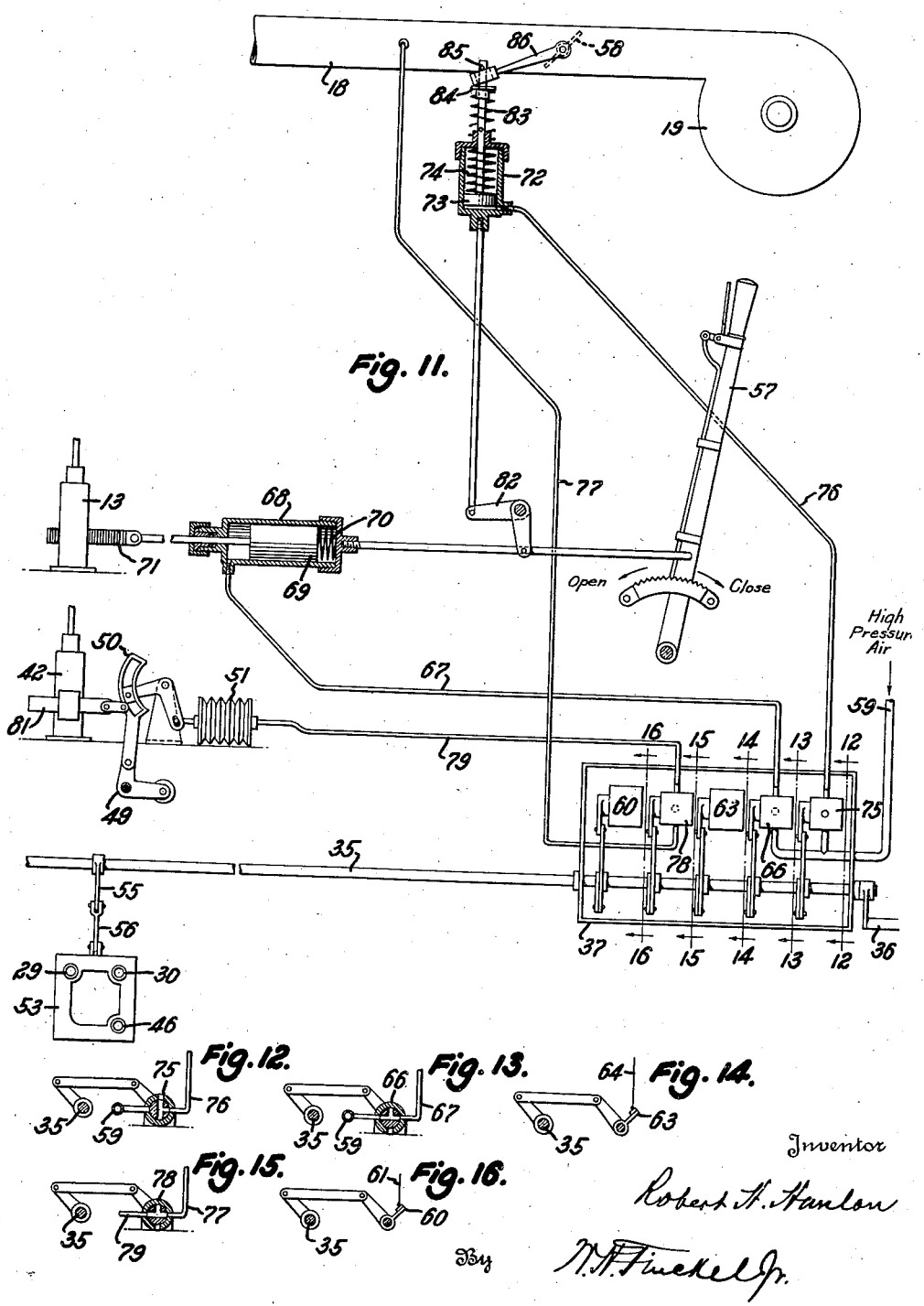

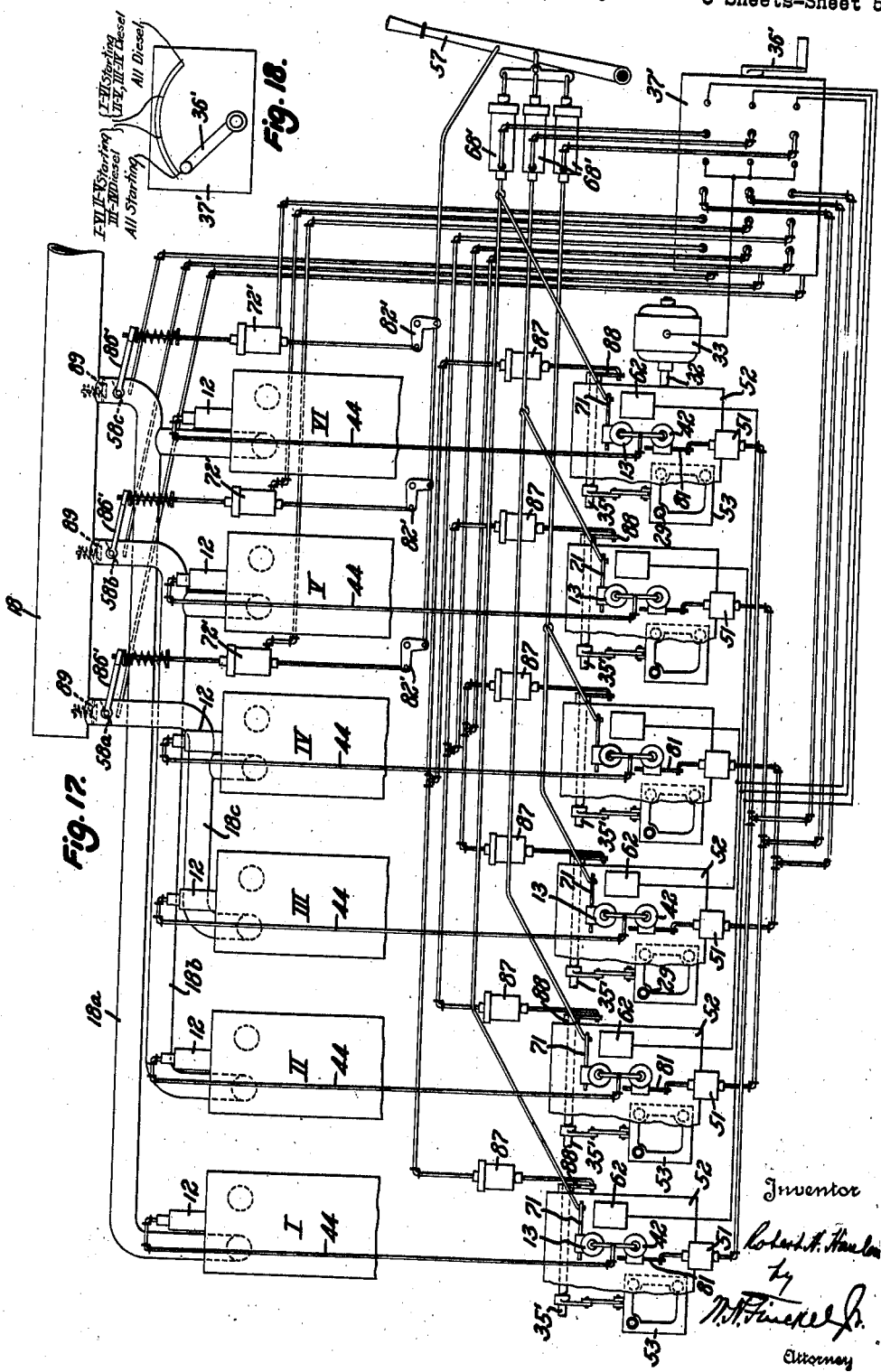

Patented May 9, 1944

2,348,621

UNITED STATES PATENT OFFICE 2,348,621

METHOD OF OPERATING ENGINES

Robert H. Hanlon, Wadsworth, Ohio, assignor to The Ohio Injector Company, Wadsworth, Ohio, a corporation of Ohio Application March 27, 1943, Serial No. 480,818

22 Claims. (Cl. 123—180)

This invention relates to a method of operating internal combustion engines, and it has particular reference to a method and means for starting Diesel engines under load, especially direct drive Diesel locomotives.

As is well known, Diesel engines which are coupled direct to the load are customarily started by operating them with compressed air at high pressure until sufficient velocity has been attained to enable them to function upon their normal cycle with compression ignition of the combustible charges. This mode of starting, though practical, entails the provision of air compressing and storage apparatus of large capacity and out of proportion to the ultimate function, and thus necessitates a consumption of power tending to decrease the over-all efficiency of the power plant as a whole.

Modifications of the broad principle of air starting of Diesel engines have been developed, including the addition to, and burning by spark ignition in, the high pressure starting air, within the engine cylinders during the working strokes of the pistons, of fuel of the same nature as that used during normal Diesel operation, but this starting principle still requires the provision of air compressing and storage apparatus of a capacity out of proportion to the work accomplished.

Other types of Diesel engine starting apparatus include auxiliary combustion chambers in which combustible charges are fired and from which the hot, high-pressure gases of combustion are fed to the working cylinders of the engine. But in these types, also, additional apparatus is required which, after the engine begins to function upon its normal cycle, becomes inoperative and is therefore an uneconomical adjunct.

The object of the present invention is to obviate the defects inherent in Diesel engine starting practice as now known, particularly in the starting of Diesel engines under load, and to that end the invention provides a method and means for starting Diesel engines, especially when under load, in which combustible charges of air under relatively slight pressure, and fuel, preferably injected fuel, are introduced into selected cylinders of the Diesel engine, spark ignited, exhausted, and scavenged, and this cycle repeated as often as necessary to cause the engine to turn over and to move its load with sufficient velocity to make possible operation of the engine upon its normal Diesel cycle, with compression ignition. Thus there is produced within the selected working cylinders of the engine a cyclical repetition of power impulses which may be maintained until normal Diesel operation is made possible, and it will be understood that this cyclical repetition is not dependent upon any movement of the engine pistons or crankshaft but will be carried on until such movement has been initiated and accelerated to the stage where normal Diesel operation is possible.

The means whereby the starting method of the invention may be practiced include, in a representative embodiment, inlet and exhaust valve operating means, fuel injection means, and spark ignition means, driven independently of the engine crankshaft, and controls therefor including means whereby the engine cylinders may be transferred from the starting cycle to normal Diesel operation, and preferably thus transferred either as a unit or in selected multiples or groups.

Aside from the means just referred to, which will preferably be in the form of accessory apparatus built into or intimately associated with the engine itself, the invention requires for its efficient practice only means for furnishing to the engine cylinders air under relatively slight pressure as compared to the 250# to 500# pressure per square inch normally employed for airstarting of Diesel engines and this air may readily be furnished by the blower or compressor which may form a part of modern Diesel engine installation, as a source of super-charging air.

Thus the starting method and means according to the invention requires no bulky, power-consuming, space-occupying apparatus as adjuncts to the Diesel engine itself, and tends to greater efficiency per pound load than has been possible in the starting practices heretofore known.

In the accompanying drawings illustrating the invention, in the several figures of which like parts are similarly designated.

Fig. 6 is an end elevation showing semi-diagrammatically a Diesel engine equipped for operation in accordance with the invention.

Fig. 7 is a plan view of the cam mechanism, with the cover of the casing removed, for one engine cylinder.

Fig. 8 is a section taken on line 8—8 of Fig. 7.

Fig. 8a is a fragmentary view similar to Fig. 8 but showing a modified form of fuel control cam.

Fig. 9 is a section taken on line 9—9 of Fig. 7.

Fig. 10 is a perspective view of the starting camshaft for one engine cylinder.

Fig. 11 is a schematic view of the controls for a Diesel engine operating in accordance with the invention in an arrangement whereby all cylinders of the engine may be shifted simultaneously from operation on the starting cycle to operation on normal Diesel cycle.

Fig. 12 is a section on line 12—12 of Fig. 11.
Fig. 13 is a section on line 13—13 of Fig. 11.
Fig. 14 is a section on line 14—14 of Fig. 11.
Fig. 15 is a section on line 15—15 of Fig. 11.
Fig. 16 is a section on line 16—16 of Fig. 11.

Fig. 17 is a schematic view illustrating an arrangement of controls similar to those shown in Fig. 11 but adapted to the shifting of the engine cylinders from starting cycle operation to normal Diesel cycle operation in complemental pairs, and Fig. 18 is an end view of the control box of the modification of Fig. 17.

As has been pointed out briefly in the foregoing, the invention provides a starting cycle including the steps of introducing into a cylinder of the engine, the piston of which is at or near, but preferably past, top dead center, air at relatively slight pressure, say between 5# and 60# per square inch, injecting into such air fuel, preferably in accordance with solid injection practice, igniting the combustible mixture thus formed by timed spark ignition, and exhausting and scavenging the combustion gases.

It is presumed that the initial cycle of operations thus performed will produce some movement of the piston, and hence of the crankshaft, but such movement is not essential to the functioning of the starting cycle, for the reason that, in view of the fact that the combustion space is scavenged, the starting cycle may be repeated automatically until movement of the piston is accomplished to cause crankshaft movement through approximately 180° (assuming that the piston was originally approximately at top dead center) or to bottom dead center.

Obviously, in a multi-cylinder engine, a six cylinder, four-cycle, engine for example, the usual three-throw crankshaft will cause the pistons of two cylinders to be at the same position in their respective cylinders, and this makes possible the alternate production of power impulses of the starting cycle in these two cylinders. That is to say, when one of these complemental or companion cylinders is being exhausted and scavenged, the other will be firing and producing a power impulse, thus avoiding any occurrence of lulls in the cycle, so far as the production of power is concerned, and insuring that, throughout operation on the starting cycle, there will be a constant effort acting through the pistons to impart angular movement to the crankshaft.

In types of engines other than six cylinder, four-cycle engines, in which there may be other definite angular relationship of the crank throws of the crankshaft and of the pistons connected therewith, the cylinders which will constitute the complemental or companion cylinders will be those, preferably treated in pairs, the pistons of which are simultaneously on the out stroke, though not necessarily at the same angular position relatively to the crankshaft.

Figure 4:
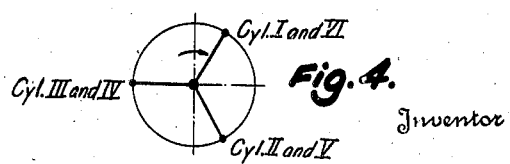
Fig. 4 is a crankshaft diagram of a six cylinder four cycle engine suitable for the practice of the invention.

Referring to Fig. 4, it will be seen, for example, that the cylinders may be, and normally would be, paired I—VI, II—V, III—IV. Thus, during operation upon the starting cycle of the invention, these pairs of cylinders would form the complemental or companion cylinders referred to and each one of a pair would complement its mate in the production of power to produce torque upon the crankshaft.

Figure 2:
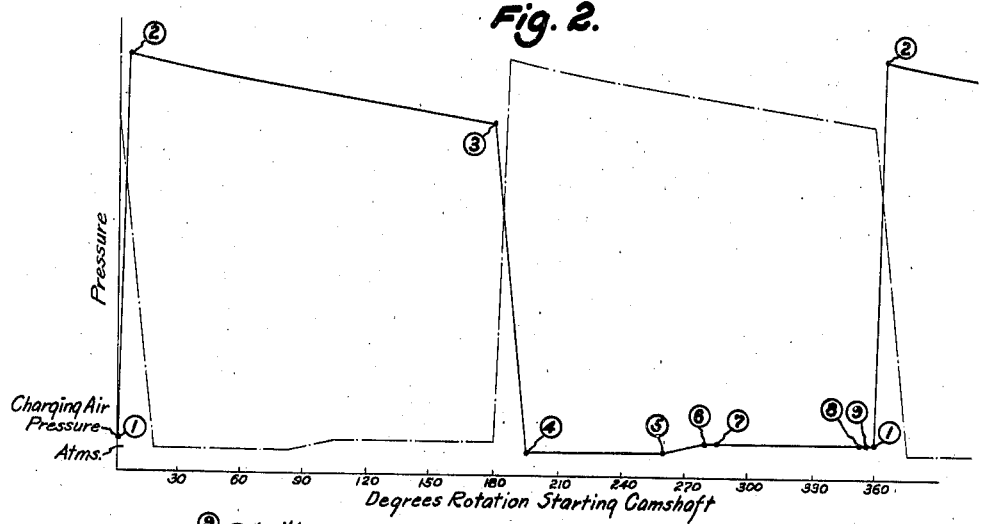
Fig. 2 is a pressure diagram showing an approximation of the indicator card made by one cylinder, and a companion or complemental cylinder during 360° of rotation of the starting camshaft.
Figure 3:
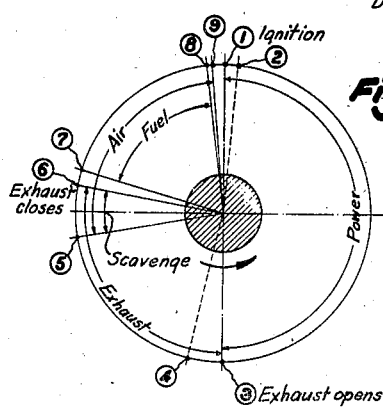
Fig. 3 is a starting camshaft angle diagram showing the various periods of starting cycle functions.

Having reference, now, to Figs. 2 and 3, and assuming that cylinder I has been supplied with a combustible charge in the manner hereinbefore explained, it will be seen that spark ignition takes place at point 1, whereupon there is an almost immediate pressure rise to point 2, this pressure gradually dropping off from point 2 to point 3 due to heat losses, and when the exhaust valve is opened at point 3, the pressure immediately drops to point 4 until, at point 5, the intake valve is opened to admit scavenging air, the scavenging period extending from point 5 to point 6 where closing of the exhaust valve occurs and pressure is established equal to that of the admitted charging air, whereupon, at point 7 the fuel injection cam begins to operate the fuel pump on the feeding stroke and continues thus to function to point 8, the amount of fuel injected, and the period of injection, being controlled as will later appear. The inlet valve closes at point 9.

It will be understood that points 2 and 4 are approximated upon the starting camshaft angle diagram, Fig. 3, as they may change due to various factors, such as speed of rotation of the starting camshaft, and/or rotation of the crankshaft. Also, the position of the piston in the cylinder will be a factor in this regard.

Figure 1:
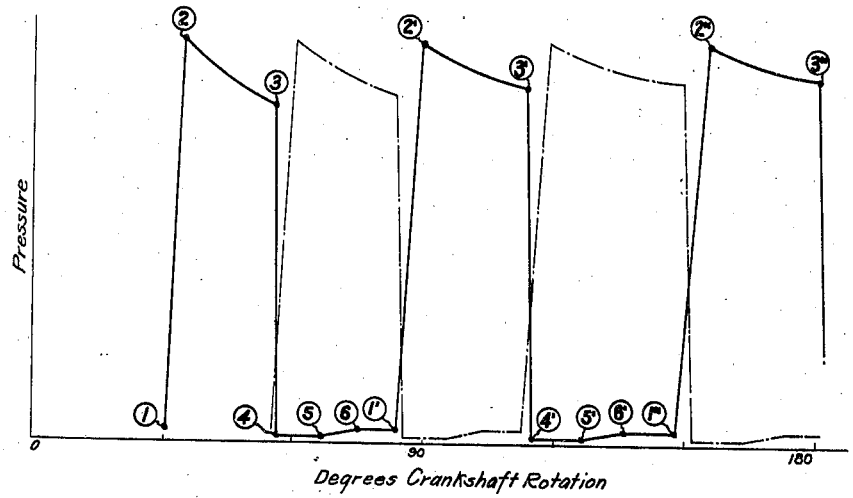
Fig. 1 is a pressure diagram showing an approximation of the indicator card made by a selected cylinder and a companion or complemental cylinder during 180° of crankshaft rotation with the starting cycle of the invention in operation.

As shown in Figs. 1 and 2, the pressure curve for one cylinder appears in full lines, and that for its companion or complemental cylinder appears in dot and dash lines, and it will be seen, as has just been pointed out, that when one cylinder of the pair is firing and establishing pressure, the other is exhausting to substantially zero pressure, thus producing the continuous torque effect referred to.

In Fig. 1, piston and crankshaft movement during the starting cycle is shown reflected in the pressure diagram, and here the diagram of Fig. 2 is somewhat conventionalized, but the corresponding points bear the same or similarly appropriate reference characters. And it will be noted that, as crankshaft movement progresses, the drop in pressure from point 2 to point 3 decreases, due partly to the reduction in cooling effect and partly to the fact that the volume of the combustible charge is increased to maintain desired pressure in the gradually increasing combustion space. It will be noted, also, that during the rotation of the crankshaft through 150° (it being assumed that the piston is at 30° past top dead center at starting) three power impulses are shown, as illustrative only (it being appreciated that a greater or smaller number is possible), as indicated at 1, 1' and 1", and that the angular distance between these impulses increases as angular velocity increases. Due to the provision of an engine-driven compression relief cam, hereinafter more particularly referred to, the exhaust valve will be opened immediately upon the piston reaching bottom dead center, 180°, 3", Fig. 1.

It is conceivable, of course, that many repetitions of the starting cycle, best illustrated in Fig. 2, may occur before any piston and crankshaft movement takes place, in which case the diagram of Fig. 1 would include a corresponding number of substantially vertical lines overlying one another and preceding the line 1—2.

Referring to Figs. 5 to 16, in which is disclosed an embodiment of means appropriate to the practice of the method of the invention in one of its aspects, it will be seen that the Diesel engine is shown as of six cylinder, vertical, four-cycle type, such type lending itself readily to a description of the invention in its fundamental aspects.

Each of the Diesel engine cylinders I, II, III, IV, V, and VI has the customary intake valve 10, exhaust valve 11, fuel injection valve 12, and fuel pump 13. The inlet and exhaust valves are actuated in the usual manner by means of rocker arms 14 and 15, and push rods 16 and 17, respectively, by cams carried by camshafts arranged and driven in a manner to be described later.

The intake valves 10 furnish timed communication between their respective cylinders and an air manifold 18 served by a blower or other compressor 19 driven by an auxiliary engine 20 which also drives an electric generator 21 which furnishes current for a starting camshaft driving motor and for the spark ignition means, hereinafter described, employed during operation upon the starting cycle, the ignition means including the spark plugs 22.

The exhaust valves 11 furnish timed communication between their respective cylinders and the customary exhaust manifold 23.

The usual engine camshaft 24 driven at two-to-one ratio from the engine crankshaft 25 carries an inlet cam 26, an exhaust cam 27 and a fuel pump cam 28 for each engine cylinder, and these cams function in the ordinary manner when the engine is operating upon its normal Diesel cycle, through tappets 29, 30 and 31, respectively.

Paralleling the camshaft 24 are a starting camshaft 32, driven by an electric motor 33 hereinabove mentioned, a layshaft 34 driven at one-to-one ratio from the crankshaft 25, and a shifter shaft 35 manually operated by a crank handle 36 at the control box 37, or otherwise appropriately.

The starting camshaft 32 carries an inlet cam 38, an exhaust cam 39, a fuel pump cam 40 and an ignition timing cam 41 for each engine cylinder.

The fuel pump cam 40 operates a starting fuel pump 42 through a suitable tappet 43, and the two fuel pumps 13 and 42 are coupled to deliver to a single fuel line 44 which leads to their respective fuel injection valve 12, though only one fuel pump of each pair thus made can deliver fuel, depending upon whether operation of the engine is on the starting cycle or the normal Diesel cycle, as will later be described.

The layshaft 34 caries an exhaust valve actuating compresion relief cam 45 operating through a tappet 46 and an auxiliary push rod 47 upon the exhaust valve rock lever 17, and a fuel proportioning cam 48 operating through a lever 49 and adjustable linkage 50 in combination with a pressure responsive member 51, such as a Sylphon bellows, to control the output of the fuel pump 42 in response to the combined effects of piston position and air manifold pressure, as will be explained hereinafter.

All of the cams for each cylinder are preferably housed in individual casings 52, and in order that the valve operating tappets 29, 30 and 46 may be shifted to cause the cylinders of the engine to operate alternatively upon the starting cycle or the normal Diesel cycle, as desired, each set of these tappets is carried in a slide block 53 carried on rods 54 in its respective casing 52 and slidable to position the tappets 29 and 30 over either their respective starting cams 38 and 39 or Diesel cams 26 and 27, and to position the tappet 46 over the compression relief cam 45 for the starting cycle, or to inoperative position for Diesel cycle. The block 53 is reciprocated by a link and lever connection 55—56 through the shifter shaft 35.

It will be understood that the cams will be so angularly arranged upon the starting camshaft 32 that the desired events described in connection with the description of Figs. 2 and 3 will take place in properly timed relation in the several engine cylinders, especially in the companion or complemental cylinders. In other words, the cams for cylinder VI will be displaced, clockwise, 180° from the cams of cylinder I, and similarly in the other two pairs depending upon the selected firing order.

The cams 45 and 48 on the layshaft will be appropriately angularly positioned for each cylinder with respect to the position of the piston therein so that, as to cams 45, the exhaust valves of those cylinders in which the pistons are moving on the in stroke will be opened to relieve compression in the cylinders. Also, these cams will function to provide for opening of the exhaust valves when the pistons have reached bottom dead center, as hereinbefore explained in connection with the description of Fig. 1. As to the cams 48, the further the pistons are from top dead center on their out or working stroke, the greater the amount of fuel the fuel pumps will be adjusted to deliver to thus maintain the fuel-to-air ratio of the combustible charges at approximately 15 to 1, by weight, which is considered to be proper for most efficient operation.

Referring to Figs. 5 and 11 to 16, wherein there is shown semi-diagrammatically an embodiment of control devices for operating the engine in accordance with the invention, particularly when, after operation upon the starting cycle, all of the engine cylinders are shifted simultaneously from the starting cycle to the normal Diesel running cycle, it will be seen that there is a throttle lever 57 through which engine speed may be controlled, and that the control box 37 contained a plurality of valves and electric switches, shown adjusted for operation upon the starting cycle particularly in Figs. 12 to 16.

These controls include, also, automatic throttle-influenced adjusting means for the butterfly valve 58 of the air manifold 18 and automatic throttle-coupling means for the main fuel pumps 13.

Assuming that the engine is to be operated in accordance with that aspect of the invention wherein all engine cylinders are shifted simultaneously from operation upon the starting cycle to operation upon the normal Diesel running cycle, and having reference particularly to Figs. 5 to 16, the practice of the invention is substantially as follows:

The auxiliary engine 20 is started and operates the blower 19 and electric generator 21 to furnish air under pressure to the air manifold 18, and electric current for the motor 33 and spark ignition apparatus including the spark plugs 22, respectively. High pressure air is also furnished through a manifold 59 (Fig. 11) to the valves in the control box 37.

Figure 5:
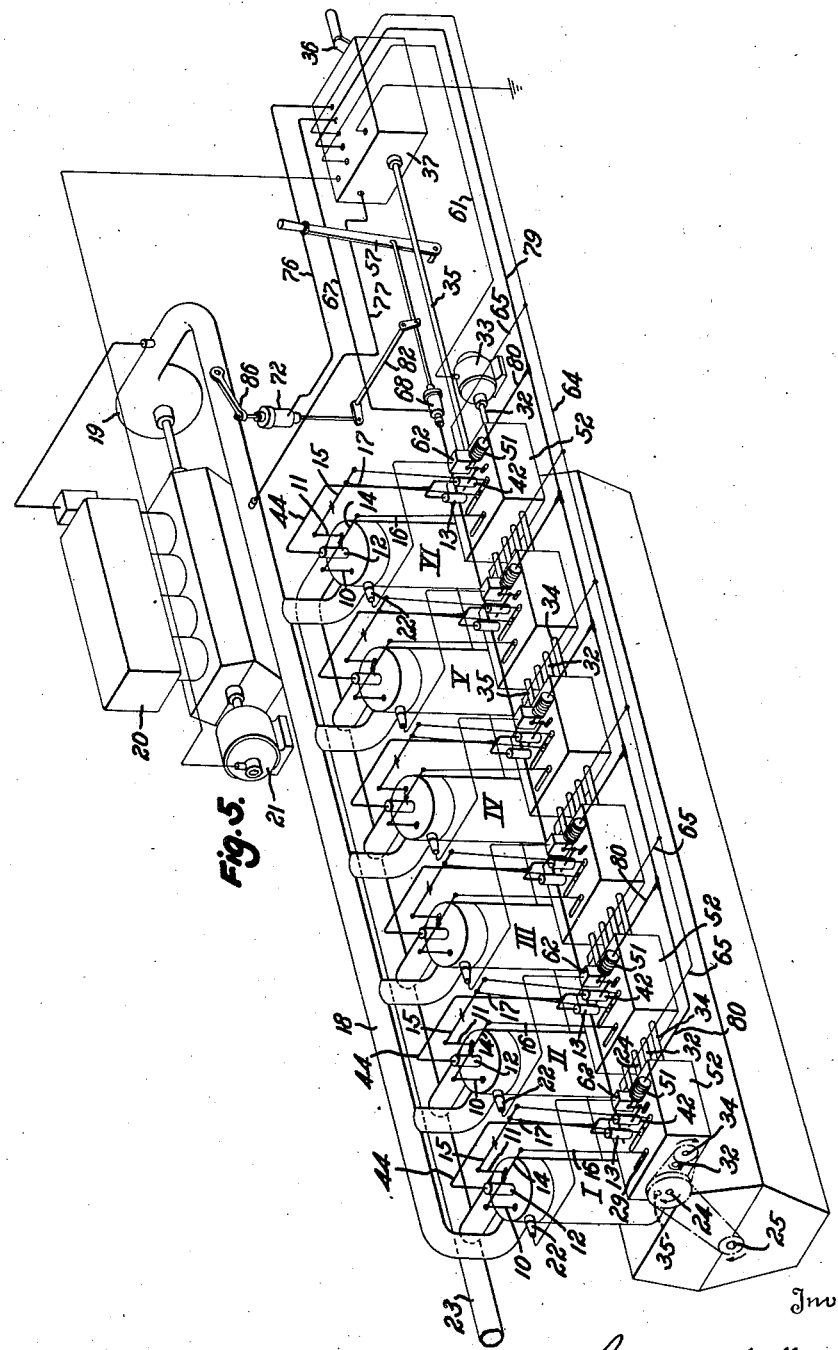
Fig. 5 is a schematic perspective view of a six cylinder Diesel engine with an embodiment of associated means suitable for operating the engine in accordance with the invention.

With the crank handle 36 of the control shifter shaft 35 moved counter-clockwise to the position shown, the slide block 53 carrying the tappets 29, 30 and 46 will be moved to position these tappets over the intake, exhaust and compression relief cams 38, 39 and 45 of the electric motor-driven starting camshaft 32 and engine-driven layshaft 34, respectively, or, in other words, to the position shown in Figs. 7 and 9. Simultaneously, the electric motor 33 will be energized through switch 60 (Fig. 16) and lead 61 (Fig. 5), and current will be available at the ignition timing and spark coil means 62 (Figs. 5 and 6) through switch 63 (Fig. 14) and lead 64 with its branches 65 (Fig. 5). Also high pressure air will be fed through valve 66 and conduit 67 (Figs. 5, 11 and 13) to the cylinder 68 of the automatic throttle coupling means (Figs. 5 and 11) to retract the piston 69 thereof against the pressure of spring 70 and thus move the feed adjusting racks 71 (Figs. 6, 8 and 11) of the main fuel pumps 13 to no-feed position.

At the same time, air will be exhausted from the cylinder 72 of the means for automatically adjusting the butterfly valve 58 to permit the piston 73 of such means to move under the influence of spring 74 to thus close the valve 58 to a position such that the air passing it from the blower 19 to the air-manifold 18 is at the desired charging pressure. This is effected by way of the valve 75 and conduits 76 (Figs. 5, 11 and 12).

It will be understood that the conduits 67 and 76, and their counterparts in the disclosure of Fig. 17, hereinafter described, will be provided with flexible portions adapted to accommodate movement of the cylinders 68 and 72, respectively.

Coincident with the foregoing operations air at desired charging pressure is fed from the air manifold 18 through conduit 77, valve 78 and conduit 79 and its branches 80 to the pressure responsive Sylphon bellows means 51 which, as previously explained, cooperate with the fuel-proportioning cam, lever and adjustable linkage means 48, 49, 50 to appropriately position the feed adjusting racks 81 (Figs. 6, 8 and 11) of the auxiliary or starting fuel pumps 42 to proportion the amount of fuel fed to the amount of air (both by weight) in the combustion spaces of the engine cylinders.

Assuming, now, that cylinders I and VI of the engine are somewhat past top dead center and thus appropriately positioned for operation upon the starting cycle, the intake valve of cylinder I will be opened to admit a charge of air from manifold 18 and the starting fuel pump 42 will force a properly measured quantity of fuel through conduit 44 to injection valve 12 by which it will be sprayed into and mixed with the charge of air already introduced, and then this mixture will be ignited by the spark plug 22, timed by the respective cam 41. Thereafter, the events of exhausting the burned gases and scavenging the combustion space will take place, as previously described.

The power impulse thus produced by the burning of the combustible charge may or may not, but probably will, result in some piston and crankshaft movement, but in any event it is supplemented, as hereinbefore explained, by a similar cycle of events in the companion cylinder VI so timed that the power impulse in cylinder VI occurs when cylinder I is exhausting and scavenging (see Fig. 2).

Obviously, in all pairs of companion cylinders starting cycle events will take place in properly timed relation as their pistons pass top dead center on the out stroke because of the fact that the cams 48 for such other cylinders will be positioned through the crankshaft drive in accordance with the positions of the pistons in such cylinders, and the starting fuel pumps for those cylinders will be in proper feed adjustment.

Thus, repetition of the power impulses of the starting cycle in cylinders I and VI, alternately, as described, will gradually move the pistons in those cylinders and impart torque to the crankshaft, thus causing the engine to move its load. When the pistons of cylinders I and VI are approaching bottom dead center, cylinders III and IV will take up operation upon the starting cycle, and when cylinders III and IV are approaching bottom dead center cylinders II and V will take up the starting cycle. Those cylinders in which the pistons are moving on the in stroke, and in which both intake and exhaust valves are normally closed will be relieved of compression by the opening of their exhaust valves by their respective cams 45.

Hence, it will be apparent that, once the crank shaft is started in rotation, the engine may be operated upon the starting cycle until sufficient velocity is attained in engine and load to enable the engine to operate upon its normal Diesel cycle with compression ignition.

Thereafter, the crank handle 36 will be swung clockwise to so rotate the shifter shaft 35 that the shift blocks 53 will position the tappets 29 and 30 over their respective intake and exhaust cams 26 and 27 of the engine-driven camshaft 24 and to make the compression relief cams 45 inoperative. At the same time switches 60 and 63 will be opened to interrupt the supply of electric current to the motor 33 and to the spark ignition apparatus, respectively. Also, valve 75 will admit high pressure air to cylinder 72 to open butterfly valve 58, air will be exhausted from cylinder 68 through valve 66 to impart feeding adjustment to the main fuel pumps 13 under the control of throttle lever 57, and the Sylphon bellows means 51 will be made inoperative by exhausting them through valve 78.

The auxiliary engine 20 may be continued in operation to furnish super-charging air, if desired, or it, and hence the blower 19, may be stopped and suction depended upon to introduce air into the engine cylinders. The generator 21 may be stopped by declutching if the current furnished by it is not needed for purposes other than those of the starting cycle.

It is to be noted that the cylinder 72 of the throttle-influenced control means is movable under the influence of the lever means 82 to adjust the opening of the butterfly valve 58 in response to opening and closing movement of the throttle lever 57, the spring 83 serving through the follower 84 and stop pin 85 always to keep the operating lever 86 of the valve 58 connected for positive movement, but the spring 83 will accommodate opening movement of the throttle control mechanism in excess of full open position of the butterfly valve.

As shown in Fig. 8, the fuel control cam 48 is so designed that fuel can be fed by the pump 42 throughout 180° of crankshaft movement during the starting cycle, or, in other words, during piston movement from approximately top dead center position to the end of the working stroke.

It is considered advisable, however, to provide means whereby the feeding of fuel by the pump 42 may be confined to that portion of the working stroke of the pistons during which the greatest power effect is transmitted to the crankshaft. This is particularly important where operation upon the starting cycle is continued to such speed of movement of the engine and its load, particularly in the case of direct drive locomotives, that production of the power impulses of the starting cycle would be uneconomical, and practically a waste of fuel and air, if continued after rotation of the crankshaft through more than 135° past top dead center of the pistons.

To this end the control cam for the fuel pump 42 may take the form illustrated in Fig. 8a, wherein provision for feeding fuel is limited to 135° of rotation of the cam and during the remainder or 225° of its rotation the pump may be automatically adjusted to no-feed condition.

Means are preferably provided to close communication between the air manifold 18 and the respective cylinders when the exhaust valves of such cylinders are opened by the cams 45 to relieve compression, so that there may be no waste of air through the thus opened exhaust valves. As appropriate means to this end, the several branches of the air manifold 18 may be provided with shut-off valves 18' (Fig. 6) which are normally held in open position during the feeding of fuel by the pumps 42, but which are closed when the controls of such pumps are in the no-feed position. Such valves may be automatically operated to closed position and open position, by means actuated by, or in timed relation to, the actuation of the exhaust valve compression relief means. For example, the cams 45 or their tappets 46 may open and close electric switches 45' (Fig. 6), or air valves, or other appropriate means, which will control similarly appropriate means, such as solenoids 18'', for closing and opening the valves 18' in the branches of the air manifold.

In Figs. 17 and 18 wherein is shown, semi-diagrammatically, an embodiment enabling the engine cylinders to be shifted in their complemental pairs I—VI, II—V, III—IV, from operation upon the starting cycle to normal Diesel cycle, it will be apparent that the mechanism employed is quite similar to that already described. However, the controls for the shift blocks 53 of the cylinders include air cylinders 87 connected for simultaneous operation in pairs and having the rods of their pistons operatively connected with cranks 88 on the individual shifter shafts 35' of the several shift blocks 53.

Also, three separate throttle control cylinders 68', independently air controlled, are provided for adjusting the feed racks 71 of the main fuel pumps 13 in pairs, and the Sylphon bellows controls for the feed racks 81 of the starting fuel pumps 42 are likewise coupled in pairs, as are also the leads to the ignition timers 62.

Moreover, in order that cylinders operating on the Diesel cycle may not, during their scavenging periods cause such fluctuations of air pressure in the air intake manifold 18 that cylinders working on the starting cycle and receiving charges of air may blow back into the air intake manifold, this manifold is provided with three branches 18a, 18b and 18c, leading respectively to the pairs of cylinders I—VI, II—V and III—IV, and each branch is provided with a check valve 89 opening outwardly with respect to the air manifold 18.

For example, assume that the control handle 36' (Fig. 18) is in the position where cylinders I and VI are operating upon the starting cycle, and all the other cylinders are operating on normal Diesel cycle, and that the crankshaft of the engine is in such a transient position that the piston of cylinder II is at top dead center with both the exhaust valve and the intake valve of that cylinder wide open. Cylinder II then being scavenged, a rapid rush of air will occur from manifold 18 past check valve 89 of manifold branch 18b, through cylinder II and past its open exhaust valve to atmosphere. Thus, it will be apparent that each scavenging period of the cylinders operating on Diesel cycle will be apt to cause momentary fluctuations in the pressure of air in the manifold 18. But by provision of the manifold branches and their check valves 89, the cylinders working on the starting cycle and receiving charges of air at normal predetermined pressure from the manifold 18 will not be permitted during such momentary fluctuations to lose this pressure, by blowing back into manifold 18 when these fluctuations reduce the pressure in the manifold to less than the predetermined normal pressure.

The butterfly valves 58a, 58b and 58c for the respective branches of the manifold 18 are operated by levers 86' controlled by separate cylinders 72' and lever means 82' connected with the throttle 57 in a manner and for a purpose similar to the butterfly valves 58 hereinbefore described. In addition, means similar to those shown in Fig. 6 may be provided for holding completely closed the butterfly valves of those pairs of cylinders which are not firing during operation upon the starting cycle so that charging air admitted to them will not be wasted to atmosphere when the exhaust valves are operated to relieve compression in those cylinders.

The control box 37' is similar to the control box 37 in the arrangement and function of its valves and switches operated by the crank handle 36' but, obviously, three sets of valves and switches are employed and their control by the handle 36' is such that, as indicated in Fig. 18, in the left hand position all cylinders are set for operation upon the starting cycle, in the next clockwise position two cylinders are set for operation on the normal Diesel cycle and four on the starting cycle, in the third clockwise position four cylinders are on Diesel cycle and two on starting cycle, and in the last clockwise position all cylinders are on Diesel cycle.

Thus, in accordance with the embodiment of mechanism illustrated in Figs. 17 and 18 it is apparent that great flexibility is possible in control of the engine and in shifting from starting cycle to normal Diesel cycle operation. Moreover, it is possible by this arrangement to augment the torque produced by some of the cylinders which are operating upon the Diesel cycle with the torque of cylinders working on the starting cycle.

Various modifications of the principle of shifting from starting cycle to Diesel cycle are possible to accommodate requirements of design and characteristics of operation of the engines particularly concerned, and also in accordance with the number of cylinders of a particular engine.

Furthermore, appropriate means for starting the engine in reverse may be provided, especially where, as is preferred, the drive is direct to the load, such as would be the case in a direct drive Diesel locomotive.

It is conceivable that the method and the apparatus embodiment of the invention, as hereinbefore described, are susceptible of a variety of modifications within the purview of the invention broadly interpreted. For example, a vertical Diesel engine of the six cylinder, four cycle type is illustrative only, and may, alternatively, be of horizontal, double acting, two cycle or other varieties or combinations of same. Also, instead of employing the solid injection form of fuel supply, the fuel may be mixed with air prior to its admission to the cylinders, in which case the starting fuel pumps 42 could be dispensed with, and fuels of greater volatility may be employed for starting than for normal running of the engine.

What I claim is:

1. The method of operating internal combustion engines in starting, particularly in starting under load, including the uninterrupted repetitive production in the engine cylinder, while its piston is on the out stroke, of the cyclical steps of introducing into the engine cylinder a combustible charge of fuel and air, igniting such charge, and exhausting the combustion gases.

2. The method of operating internal combustion engines in starting, particularly in starting under load, including the uninterrupted repetitive production in the engine cylinder, while its piston is on the out stroke, and until such out stroke is completed, of the cyclical steps of introducing into the engine cylinder a combustible charge of fuel and air, igniting such charge, and exhausting the combustion gases.

3. The method of operating internal combustion engines in starting, particularly in starting under load, including the uninterrupted repetitive production in the engine cylinder, while its piston is on the out stroke, of the cyclical steps of introducing into the engine cylinder a combustible charge of fuel and air, igniting such charge, and exhausting and scavenging the combustion gases.

4. The method of operating internal combustion engines in starting, particularly in starting under load, including the cyclical steps of introducing into the engine cylinder a combustible charge of fuel and air, igniting such charge, and exhausting the combustion gases, this operation cycle being uninterruptedly repetitive while the engine piston is static on its out stroke and during piston movement on the out stroke until such stroke is completed.

5. The method of operating multi-cylinder internal combustion engines in starting, particularly in starting under load, including the cyclical steps of introducing and igniting combustible charges of fuel and air, and exhausting the combustion gases, alternately in companion cylinders the pistons of which are on the out stroke, this operation cycle being uninterruptedly repetitive during a working stroke of such pistons.

6. The method of operating multi-cylinder internal combustion engines in starting, particularly in starting under load, including the cyclical steps of introducing and igniting combustible charges of fuel and air, and exhausting the combustion gases, alternately in companion cylinders the pistons of which are on the out stroke, and repeating this operation cycle during a working stroke of such pistons, the period of power impulse in one of such cylinders overlapping the period of exhaust in the other cylinder.

7. The method of operating multi-cylinder internal combustion engines in starting, particularly in starting under load, including the cyclical steps of introducing and igniting combustible charges of fuel and air, and exhausting the combustion gases, alternately in companion cylinders the pistons of which are on the out stroke, and repeating this operation cycle during a working stroke of such pistons and until such working stroke is completed, and similarly performing such cyclical operation steps in other companion cylinders in the proper order of such cylinders with respect to rotation of the crankshaft until such time as the engine is enabled to function upon its normal running cycle.

8. The method of operating Diesel engines in starting, particularly in starting under load, including the uninterrupted repetitive production in the engine cylinder, while its piston is on the out stroke, of the cyclical steps of introducing into the engine cylinder a combustible charge of fuel and air, igniting such charge, and exhausting the combustion gases.

9. The method of operating multi-cylinder Diesel engines in starting, particularly in starting under load, including the cyclical steps of introducing and igniting combustible charges of fuel and air and exhausting the combustion gases, alternately in companion cylinders the pistons of which are on the out stroke, and repeating this operation cycle during a working stroke of such pistons and until such working stroke is completed, and similarly performing such cyclical operation steps in other companion cylinders in the proper order of such cylinders with respect to rotation of the crankshaft until such time as the engine is enabled to function upon its normal Diesel running cycle with compression ignition.

10. In Diesel engine starting as claimed in claim 9, the step whereby when the engine is enabled to function upon its normal Diesel running cycle, all of the cylinders are simultaneously shifted from operation upon the starting cycle to operation upon normal Diesel cycle.

11. In Diesel engine starting as claimed in claim 9, the step whereby when the engine is enabled to function upon its normal Diesel running cycle the cylinders are shifted successively in complemental pairs from operation upon the starting cycle to operation upon normal Diesel cycle.

12. The method of operating internal combustion engines in starting, particularly in starting under load, including the cyclical steps of introducing into the engine cylinder a combustible charge of fuel and air, igniting such charge, and exhausting the combustion gases, and repeating this operation cycle during a working stroke of the engine piston, the fuel-to-air ratio of successive combustible charges being maintained substantially constant throughout piston movement as the combustion space increases.

13. The method of operating Diesel engines in starting, particularly in starting under load, including the cyclical steps of introducing into the engine cylinder a combustible charge of fuel and air, igniting such charge, and exhausting the combustion gases, and repeating this operation cycle during a working stroke of the engine piston, the fuel-to-air ratio of successive combustible charges being maintained substantially constant throughout piston movement as the combustion space increases.

14. Means for operating internal combustion engines in starting, particularly in starting under load, including means for supplying combustible charges of fuel and air, means for igniting such charges, and means driven independently of the normal engine timing for effecting intake and exhaust in the engine cylinder and for timing the ignition means, whereby successive combustible charges may be introduced into the engine cylinder, ignited, and the combustion gases exhausted, during a single working stroke of the engine piston.

15. Means for operating internal combustion engines in starting, particularly in starting under load, including means for supplying combustible charges of fuel and air, means for igniting such charges, means driven independently of the normal engine timing for effecting intake and exhaust in the engine cylinder and for timing the ignition means, whereby successive combustible charges may be introduced into the engine cylinder, ignited, and the combustion gases exhausted, during a single working stroke of the engine piston, and means for maintaining the fuel-to-air ratio of the combustible charges substantially constant throughout piston movement as the cylinder volume increases.

16. Means for operating internal combustion engines in starting, particularly in starting under load, including means for supplying combustible charges of fuel and air, means for igniting such charges, means driven independently of the normal engine timing for effecting intake and exhaust in the engine cylinder and for timing the ignition means, whereby successive combustible charges may be introduced into the engine cylinder, ignited, and the combustion gases exhausted, during a single working stroke of the engine piston, and fuel feeding control means driven in timed relation to the engine crankshaft, and cooperating with means responsive to the pressure of air combining to form the combustible charges for maintaining the fuel-to-air ratio substantially constant throughout piston movement as the cylinder volume increases.

17. Means for operating internal combustion engines in starting as claimed in claim 16, in which the fuel feeding control means include means for terminating feeding of fuel prior to completion of a full working stroke of the engine piston.

18. Means for operating multi-cylinder internal combustion engines on a starting cycle, particularly in starting under load, including means for supplying combustible charges of fuel and air, and means for igniting such charges, in selected complemental pairs of the engine cylinders the pistons of which are adjacent to and preferably past top dead center position, and means driven independently of the normal engine timing for effecting intake and exhaust and for timing the ignition means of all engine cylinders, whereby successive combustible charges may alternately be supplied to, ignited in, and the combustion gases exhausted from, the cylinders of complemental pairs in successive cycles during a working stroke of the pistons therein.

19. Means for operating multi-cylinder internal combustion engines on a starting cycle, particularly in starting under load, including means for supplying combustible charges of fuel and air, and means for igniting such charges, in selected complemental pairs of the engine cylinders the pistons of which are adjacent to and preferably past top dead center position, means driven independently of the normal engine timing for effecting intake and exhaust and for timing the ignition means of all engine cylinders, whereby successive combustible charges may alternately be supplied to, ignited in, and the combustion gases exhausted from, the cylinders of complemental pairs in successive cycles during a working stroke of the pistons therein, and means driven in timed relation to the engine crankshaft for relieving compression in those pairs of cylinders to which no combustible charges are supplied while other pairs are working on the starting cycle.

20. Means for operating multi-cylinder internal combustion engines in starting as claimed in claim 19, in which means timed to operate conjointly with the compression-relieving means are provided for interrupting the supply of air to those cylinders to which no fuel is supplied.

21. Means for operating multi-cylinder Diesel engines on a starting cycle, particularly in starting under load, including, in addition to the engine-driven camshaft and fuel pump, means for supplying combustible charges of fuel and air, and means for igniting such charges, in selected complemental pairs of the engine cylinders the pistons of which are adjacent to and preferably past top dead center position, and means driven independently of the normal engine timing for effecting intake and exhaust and for timing the ignition means of all engine cylinders, whereby successive combustible charges may alternately be supplied to, ignited in, and the combustion gases exhausted from, the cylinders of complemental pairs in successive cycles during the working strokes of the pistons therein.

22. Diesel engine starting means as claimed in claim 21, in which means are provided for shifting operation of the intake and exhaust effecting means from the independently driven valve operating means to the engine-driven camshaft, when, due to starting cycle operation, the engine is enabled to function on normal Diesel cycle, such shifting also bringing into play means for terminating actuation of the ignition means and of the starting cycle fuel supplying means.

ROBERT H. HANLON.

CERTIFICATE OF CORRECTION.

Patent No. 2,348,621. May 9, 1944.

ROBERT H. HANLON.

It is hereby certified that error appears in the printed specification of the above numbered patent requiring correction as follows: Page 6, first column, line 70, claim 5, for the words "a working" read --the out--; and that the said Letters Patent should be read with this correction therein that the same may conform to the record of the case in the Patent Office.

Signed and sealed this 20th day of June, A. D. 1944.

(Seal)

Leslie Frazer

Acting Commissioner of Patents.